United States Patent
Frisken et al.

(10) Patent No.: US 6,263,131 B1
(45) Date of Patent: Jul. 17, 2001

(54) REFLECTIVE NON-RECIPROCAL OPTICAL DEVICE

(75) Inventors: Steven James Frisken, Randwick; John William Arkwright, Coogee; Peter Collin Hill, Glenbrook, all of (AU)

(73) Assignee: Nortel Networks (Photonics) Pty LTD., Eveleigh (AU)

( * ) Notice: Subject to any disclaimer, the term of this patent is extended or adjusted under 35 U.S.C. 154(b) by 0 days.

(21) Appl. No.: 09/345,027

(22) Filed: Jul. 2, 1999

(51) Int. Cl.[7] ................................................. G02B 6/26
(52) U.S. Cl. .............................. 385/31; 385/11; 385/27; 385/28; 385/33; 385/43; 385/44; 385/47
(58) Field of Search ................................. 385/11, 15, 24, 385/27, 28, 31, 33, 34, 43, 44, 47

(56) References Cited

U.S. PATENT DOCUMENTS

| | | | |
|---|---|---|---|
| 5,191,467 | * | 3/1993 | Kapany et al. ...................... 359/341 |
| 5,471,340 | | 11/1995 | Cheng et al. ........................ 359/281 |
| 5,768,005 | * | 6/1998 | Cheng et al. ....................... 385/11 X |
| 5,848,203 | * | 12/1998 | Kawakami et al. .................... 385/11 |
| 5,930,422 | * | 7/1999 | Cheng ................................. 385/47 |
| 6,014,475 | * | 1/2000 | Frisken .................................. 385/11 |
| 6,075,596 | * | 6/2000 | Pan et al. ............................ 356/345 |
| 6,118,910 | * | 9/2000 | Chang ................................... 385/16 |
| 6,178,044 | * | 1/2001 | Li et al. ................................ 359/484 |

* cited by examiner

Primary Examiner—Brian Healy
(74) Attorney, Agent, or Firm—Ladas & Parry

(57) ABSTRACT

A non-reciprocal optical device mapping a series of optical input/output signal waveguides to a corresponding series of optical input/output signal waveguides, the device comprising: a series of spaced apart input/output waveguides; a reflective imaging system for reflecting and focussing light emitted from the input/output waveguides; a plurality of crystal elements between the input/output waveguides and the reflective imaging means; at least one non-reciprocal polarization rotation element; wherein light emitted from a first input/output waveguide is transmitted to a second input/output waveguide in a polarization independent manner and light emitted from the second input/output waveguide is transmitted away from the first input/output waveguide.

19 Claims, 11 Drawing Sheets

REFLECTIVE NON-RECIPROCAL OPTICAL DEVICE

FIELD OF THE INVENTION

The present invention relates to the field of non-reciprocal optical devices such as optical circulators or the like.

BACKGROUND OF THE INVENTION

Optical circulator devices are well known in the art and normally comprise a series of bi-directional ports and a "non-reciprocal" mapping between ports. For example, in a three-port optical circulator device, the ports may be designated A, B and C and the non-reciprocal nature of the device is such that an input signal at Port A will be output at Port B, an input signal at Port B will be output at Port C and an input signal at Port C will be output at Port A.

It is desirable with any circulator type device to manufacture as compact and inexpensive a device as possible.

SUMMARY OF THE INVENTION

The object of the present invention is to provide for a compact form of optical circulator device having a high level of compactness and flexibility.

In accordance with a first aspect of the present invention, there is provided a non-reciprocal optical device mapping a series of optical input/output signal waveguides to a corresponding series of optical input/output signal waveguides, the device comprising: a series of spaced apart input/output waveguides; a reflective imaging system for reflecting and focussing light emitted from the input/output waveguides; a plurality of crystal elements between the input/output waveguides and the reflective imaging means; at least one non-reciprocal polarization rotation element; wherein light emitted from a first input/output waveguide is transmitted to a second input/output waveguide in a polarization independent manner and light emitted from the second input/output waveguide is transmitted away from the first input/output waveguide.

Light emitted from the second input/output waveguide can be transmitted to a third input/output waveguide and light emitted from the third input/output waveguide can be transmitted to the first input/output waveguide so as to provide for a fully circulating circulator.

The input/output signal waveguides can comprise optical fibres and mode expansion can be provided by utilizing thermally expanded core fibre ends, gradient index fibres, or a separate lensing system, or a combination of thereof.

In accordance with a further aspect of the present invention, there is provided a non-reciprocal optical device mapping a series of optical input/output signal waveguides to a series of optical input/output waveguides, the device comprising: a series of spaced apart input/output signal waveguides; a first polarization separation means for spatially separating the optical input signals emitted from the optical input/output signal waveguides into orthogonal polarization components; a first series of reciprocal rotators for applying a reciprocal rotation to the orthogonal polarization components so as to align the polarisations thereby producing aligned polarization components; a non-reciprocal rotator for applying a non-reciprocal rotation to the aligned polarization components; a second polarization separation means for spatially displacing aligned polarization components; at least one reciprocal rotator for rotating the aligned polarization components emitted from a subset of the input/output signal waveguides; imaging means for imaging the aligned polarization components to produce imaged polarization components; and reflection means for reflecting the polarization components wherein light emitted from a first input/output waveguide is transmitted to a second input/output waveguide in a polarization independent manner and light emitted from the second input/output waveguide is transmitted away from the first input/output waveguide.

Again, light emitted from the second input/output waveguide can be transmitted to a third input/output waveguide and light emitted from the third input/output waveguide can be transmitted to the first input/output waveguide so as to provide for a fully circulating circulator.

In accordance with a further aspect of the present invention, there is provided a non-reciprocal optical device comprising: at least two spaced apart rows each containing a series of input/output waveguides; a first polarization dependent displacement means spatially displacing orthogonal polarizations of light emitted from the waveguides; a first series of reciprocal rotators aligning the orthogonal polarizations emitted from the first polarization displacement means; a non reciprocal rotator rotating the aligned polarization states in a non reciprocal manner; a second polarization dependant displacement means displacing light emitted from the reciprocal rotator in a polarization dependant manner; focusing means for focusing light emitted from the waveguides substantially on the waveguides; reflection means reflecting light emitted from a first of the rows back in the direction of a second of the rows; wherein light emitted from a first one of the waveguides in a first row is transmitted to a first one of the waveguides in a second row in a non reciprocal manner.

The light emitted from the first one of the waveguides in the second row is preferably transmitted to a second one of the waveguides in the first row.

In one embodiment, the number of waveguides in each row can be four and light emitted from any one of the waveguides in a first row can be transmitted to a predetermined waveguide in the second row.

The first polarization means preferably translates one orthogonal polarization state substantially perpendicular to the rows. The first series of reciprocal rotators can comprise a series of abutted reciprocal rotators which rotate the displaced orthogonal polarizations in an opposite direction. The focusing means can be adjacent the reflection means. The second polarization displacement means can displace one of the polarizations parallel to the rows.

BRIEF DESCRIPTION OF THE DRAWINGS

Notwithstanding other forms which may fall within the scope of the present invention, preferred forms of the invention will now be described, by way of example only, with reference to the accompanying drawings in which.

DESCRIPTION OF PREFERRED AND OTHER EMBODIMENTS

In the preferred embodiment, an optical circulator type device is provided which utilises a series of optical components followed by a mirror which reflects input signals back to a series of outputs so as to provide for a fully circulating three-port circulator.

Figure 1:
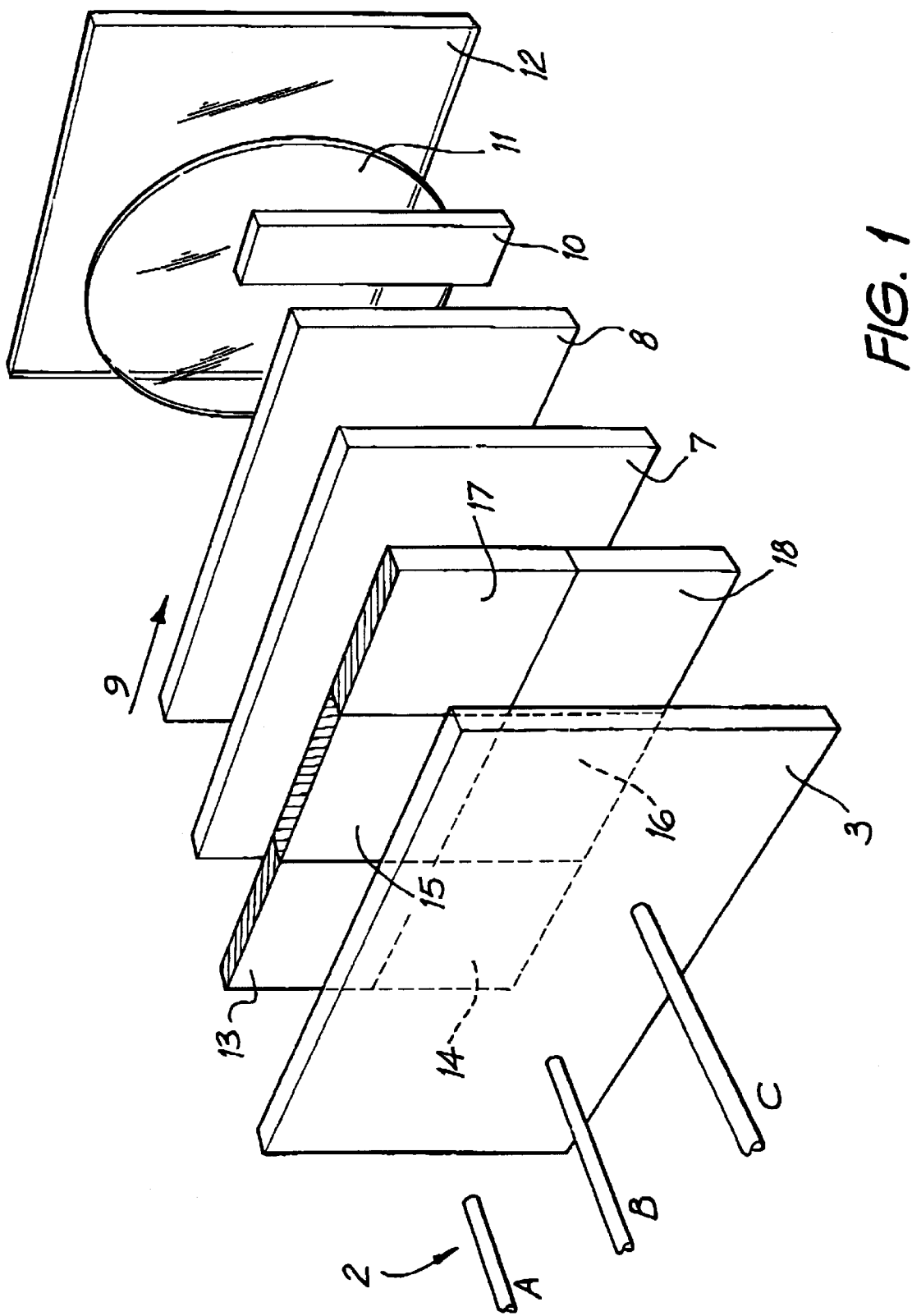
FIG. 1 illustrates schematically in perspective the arrangement of the preferred embodiment.

Turning initially to FIG. 1, there is illustrated schematically the arrangement 1 of the preferred embodiment. The preferred embodiment includes an initial horizontal array 2 of three single mode fibres (SMF) labelled A, B and C which are approximately 125 microns in diameter and can include a short length of gradient index fiber attached to an end or other forms of mode expansion as discussed hereinafter. The three fibres 2 can be arranged in corresponding V-grooves with approximately 127 microns spacing. The gradient indexed fibre is such that it projects an enlarged image of the SMF fibre mode at distances of approximately 500 microns in air and with a diameter of 30 microns. Such devices are commercially available from Highwave Optical Technologies.

The device proper consists of the following components:

1. A first walkoff crystal 3 is provided and can comprise a rutile crystal with a width of approximately 1 mm. The walkoff crystal 3 is positioned adjacent to the gradient indexed fibre and is of sufficient dimension to separate the polarisations states projected from the fibres 2.

2. Next, a series of reciprocal rotators 13, 14, 15, 16, 17, 18 are provided to achieve polarisation state equalisation of the fibres. The middle rotators 15, 16 are aligned in an orthogonal manner to the other rotators.

3. Next, a Faraday rotator 7 is provided to rotate all polarisation states by 45°.

4. Next, a rutile plate 8 is provided to allow 127 microns displacement in the direction 9.

5. Next, a half-wave plate 10 is provided to intercept only the light from the fibre C on the outgoing path.

6. Next, a lens 11 can be a gradient indexed lens of pitch such as approximate formation of the fibre images is achieved.

7. Finally, a reflective mirror surface 12 is positioned at a distance behind the lens 11 such that parallel rays are returned substantially parallel.

The arrangement of FIG. 1 is useful in providing for a fully circulating circulator in that input light from the fibre port A is output at fibre port B, input light from the fibre port B is output at fibre port C and input from fibre port C is output at the fibre port A.

Figure 2:
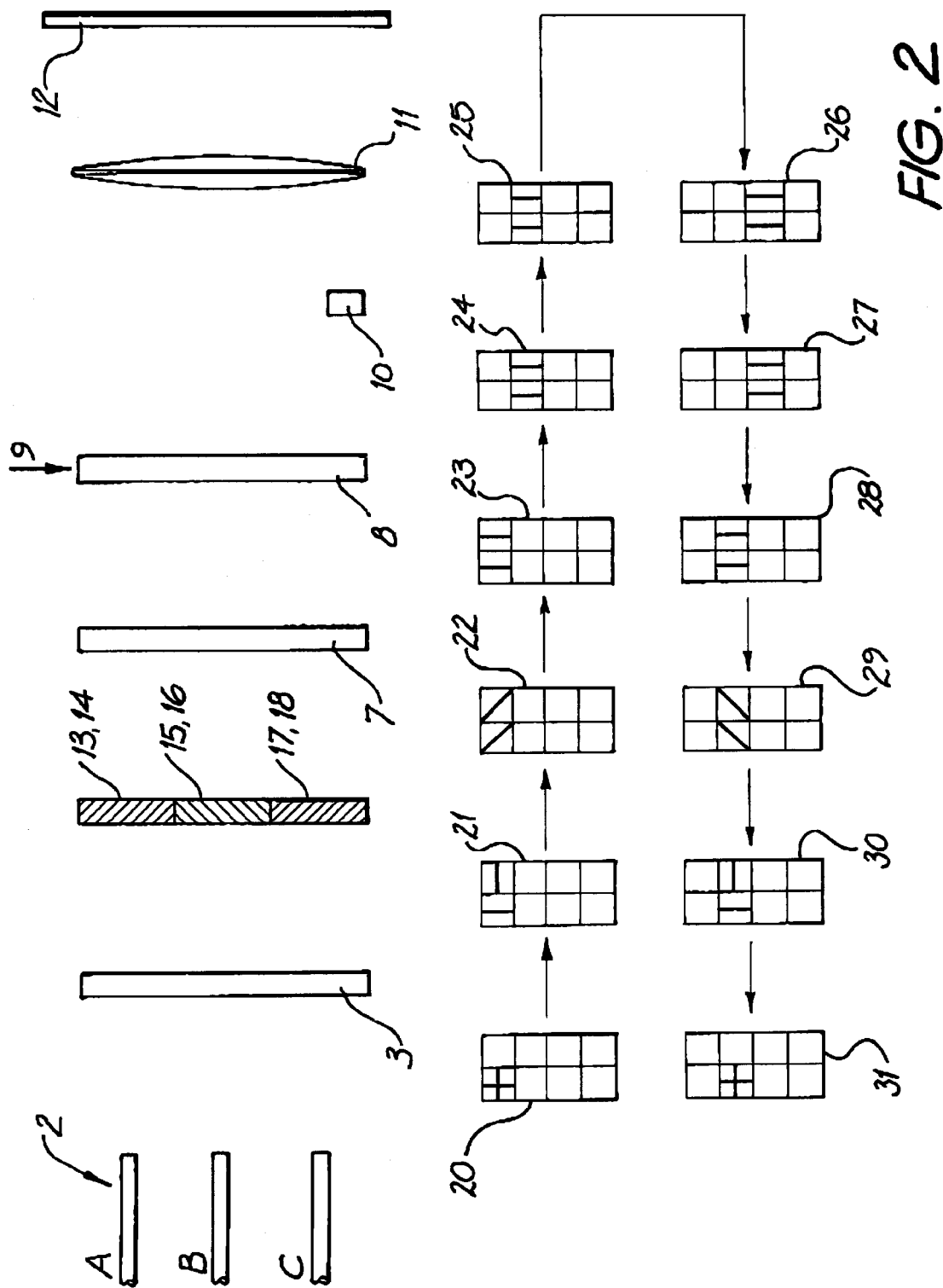
FIG. 2 illustrates a first polarization transition state diagram of light travelling from fibre A to fibre B.

Turning now to FIG. 2, there is illustrated an initial polarization transition diagram for light travelling from port A to port B. The two orthogonal polarisations states are initially spatially coincidental and are indicated by the initial cross 20. Subsequently, after traversing walkoff plate 3, the polarisations states are separated 21. The reciprocal rotators 13, 14 result in a reciprocal rotation of each of the polarisation states so as to cause the output polarization state 22 to be at 45°.

The non-reciprocal rotator 7 provides for a nonreciprocal rotation of the polarisation states which results in the aligned polarization state 23. The rutile 8 results in a translation 24 of the two polarisation states. The halfwave plate 10 is positioned so it will have no effect on the polarisation states in this case. The effect of the lensing system 11 and mirror 12 is illustrated by the polarisation state diagram 26 and results in an inversion of the spatial states upon reflection from the mirror. The halfwave plate 10 is positioned not to have an effect on the polarisation state 26 and therefore results in polarisation state 27. The walkoff plate 8 translates the polarisation states 28. The Faraday rotator 7 is a non-reciprocal device and results in a non-reciprocal rotation of the polarisation states resulting in aligned polarisation states 29. The reciprocal rotators 15, 16 are positioned to rotate the polarisation states by 45° in a reciprocal manner resulting in the polarisation state 30. The walkoff plate 3 then combines the polarisation states so as to produce output 31 having spatially combined polarisation states. Hence, the overall result is the transmission of output of fibre A to the fibre port B.

Figure 3:
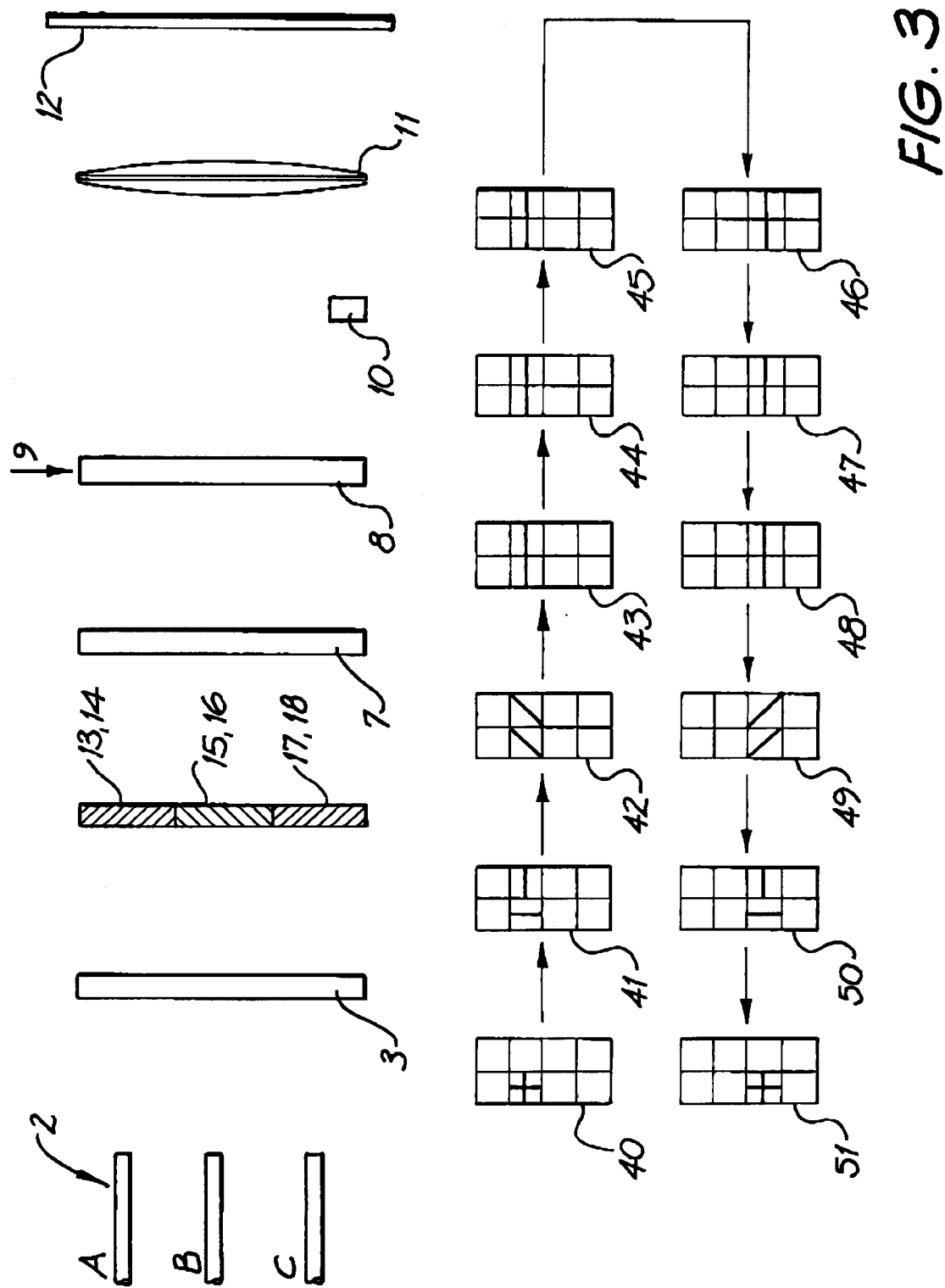
FIG. 3 illustrates a second polarization transition state diagram of light travelling from fibre B to fibre C.

Turning now to FIG. 3, there is illustrated the polarisation state transition diagram for light emitted from the fibre port B to the fibre port C. In the initial polarisation state 40, both orthogonal polarisation states are spatially coincident. The walkoff plates 3 results in a translation of one polarisation state with respect to the other 41. The reciprocal rotators 15, 16 results in the alignment of the two polarisation states 42. The non-reciprocal Faraday rotator 7 in turn results in a further rotation of the polarisation state 43. The rutile 8 has no effect 44, nor does the halfwave plate 10 which results in the polarisation state 45. The lens and mirror 11, 12 again result in an inversion of the polarisation states so as to produce the state 46. The halfwave plate 10 has no effect 47. The rutile 8 again has no effect producing polarisation state 48. The non-reciprocal Faraday rotator 7 rotates the polarisation states 49 as does the reciprocal rotator 17,18 which produces the polarisation state 50. The walkoff plate 3 combines the polarisation states so as to produce output 51 having spatially combined polarisation states.

Figure 4:
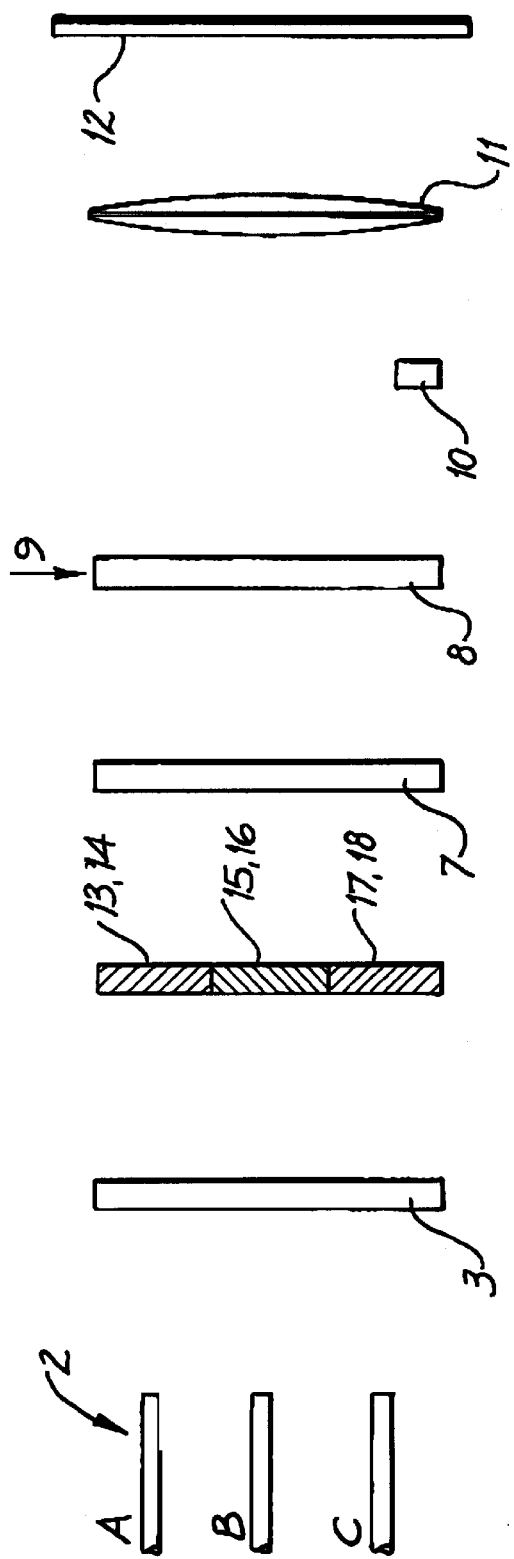
FIG. 4 illustrates a third polarization transition state diagram of light travelling from fibre C to fibre A.
Figure 4:
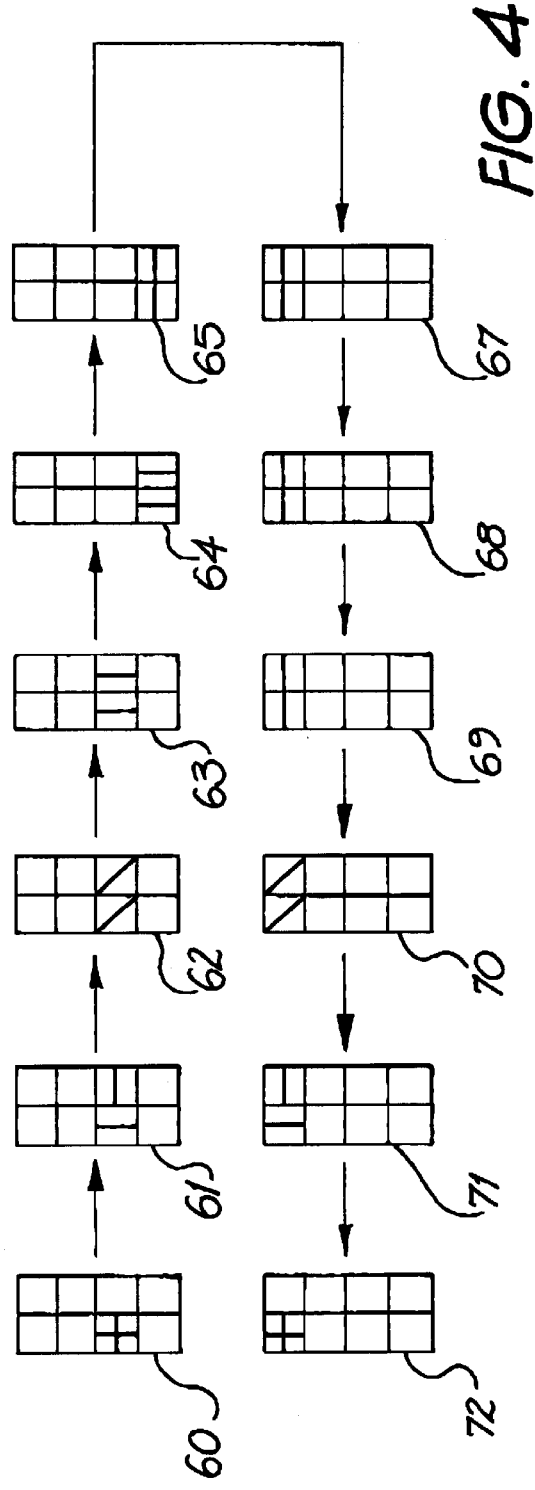

Turning now to FIG. 4, there is illustrated the polarisation state transition diagram for a fibre port C to fibre port A. Starting initially with the polarisation state 60, the walkoff plate 3 results in a splitting of the polarisation states 61. Subsequently, the reciprocal rotators 17, 18 results in a reciprocal rotation of the polarisation states to bring them into alignment. The Faraday rotator 7 in turn rotates the polarisation state to produce polarisation of state 63. The walkoff plate 8 translates the polarisation state producing the resultant polarisation state 64. The halfwave plate 10 in turn results in a rotation of the polarisation state producing polarisation state 65. Subsequently, after passing through lens 11 and being reflected by mirror 12, the polarisation state 67 is produced. The halfwave plate 10 has no effect 68 nor does the walkoff plate 8 which results in the polarisation of state 69. The Faraday rotator 7 rotates the polarisation states 70 and the reciprocal rotator further rotates the polarisation states to produce the polarisation state 71 which is combined by walkoff plate 3 to produce output 72 which is output to fibre A.

It can therefore be seen from the polarisation transition diagrams of FIGS. 2–4 that the preferred embodiment operates as a fully circulating circulator.

Figure 5:
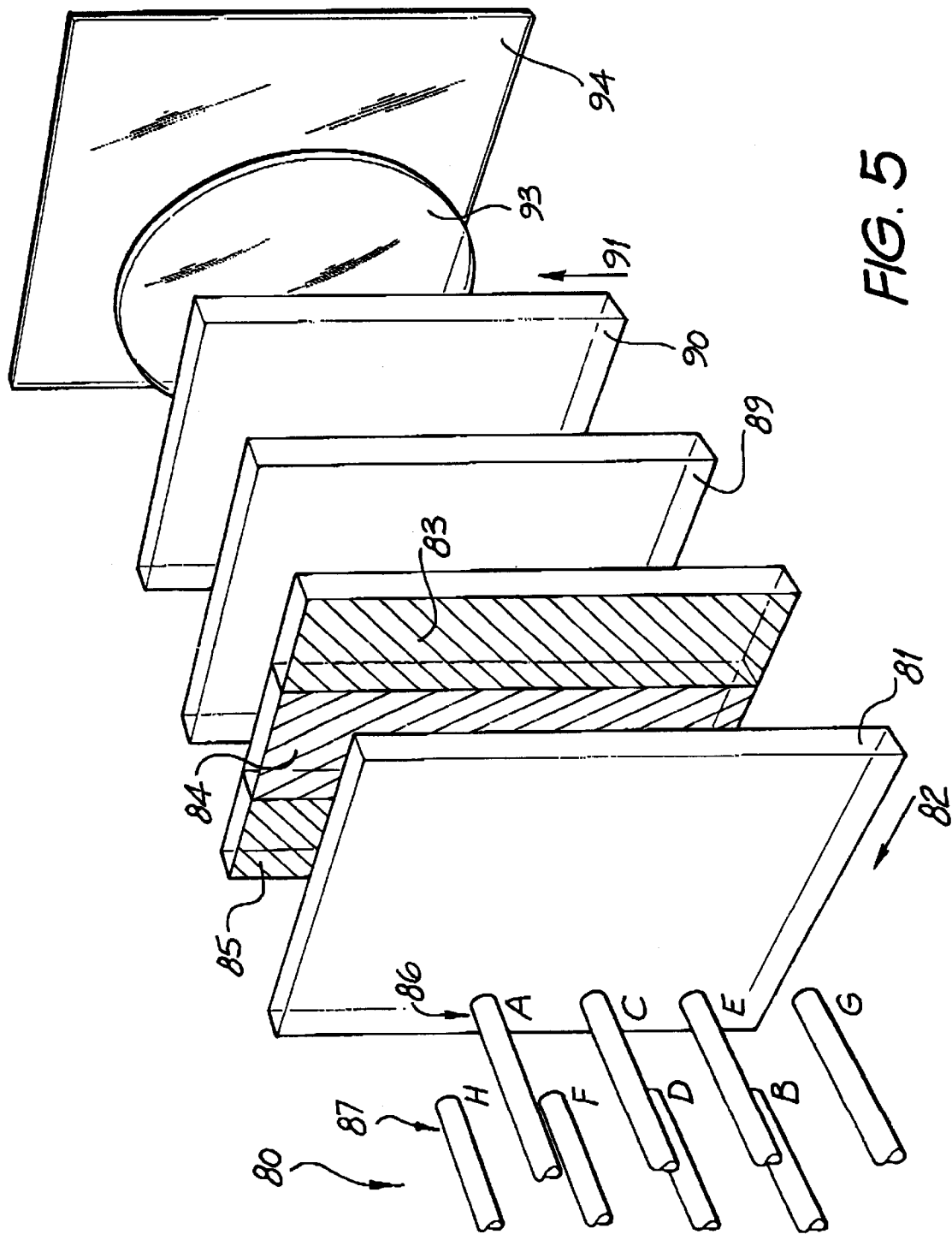
FIG. 5 illustrates schematically in perspective the arrangement of an alternative embodiment.

Turning now initially to FIG. 5, there is illustrated an alternative embodiment modified so as to provide for multiple input/output ports. In the embodiment of FIG. 5, eight fibres form input/output port 80 as shown, divided into two rows 86, 87 each indicated with a corresponding letter A to H. The port 80 can be arranged in two rows and include expanded core fibre ends, or alternatively, gradient index fibre ends of about 125 micron diameter and arranged to the V groove of approximately 127 micron spacing and 200 micron spacing between the two rows of fibres 86, 87.

A first rutile crystal 81 is provided with the width of approximately 1 mm to separate the polarisation states projected from the fibres 80. The walkoff is preferably in the direction 82.

A series of reciprocal rotators or halfwave plates 83–85 are positioned to achieve polarisation state equalisation of the light proceeding from the two spaced apart rows 86, 87. The rotator 84 has a 45 degree rotation in the opposite direction of rotation relative to the rotators 83, 85.

A non-reciprocal Faraday rotator 89 provides non reciprocal 45° rotation of all polarisation states.

Figure 6:
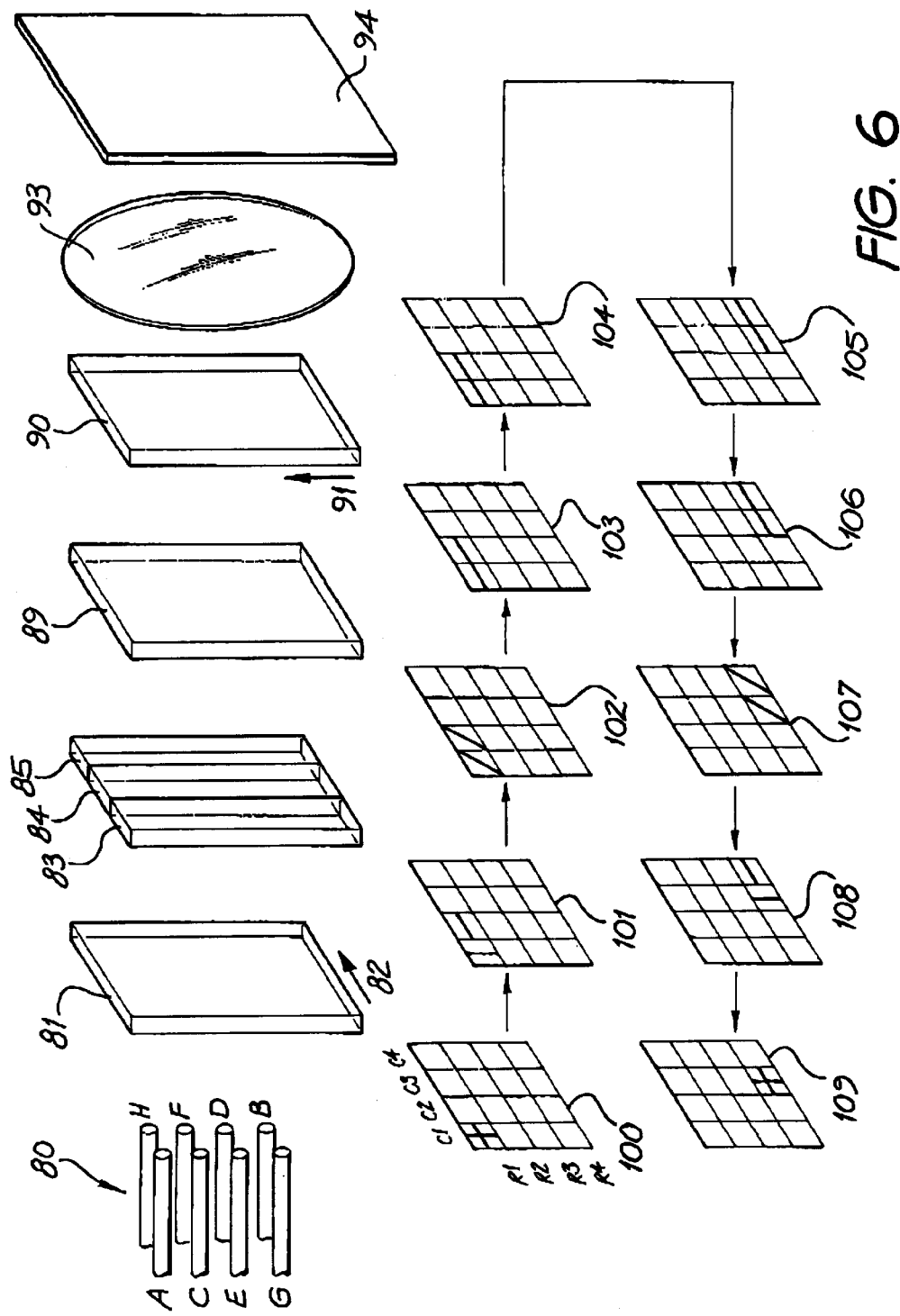
FIG. 6 to FIG. 9 illustrate polarization transition diagrams for the arrangement of FIG. 5.

Next, a Rutile crystal walkoff plate 90 is provided so as to allow for 68.5 micron displacement of the relevant polarisation state in the direction 91. Next, a gradient index lens 93 is provided such that proximate collination of all the fibre images is achieved. This is followed by a reflective mirror surface 94 positioned at a distance behind the lens 93 such that parallel rays are returned substantially parallel. Turning to FIG. 6, there is illustrated a first example polarisation state diagram for the transition from the fibre A to the fibre B.

Starting initially with the polarisation state 100 emitted from the fibre A, after the transition through the walkoff plate 81, the polarisation state is as illustrated 101. The reciprocal rotators 83–85 results in an alignment of the polarisation states 102. Next, non-reciprocal rotation by the non-reciprocal rotator 89 results in the polarisation states 103. The rutile crystal 90, as a result of having its walkoff direction 91 has no effect on the polarisation state 104. The lens 93 and mirror 94 result in an inversion of the polarisation state 105. Again the polarization state is unaffected 106 by the walkoff plate 90. The non-reciprocal rotator 89 provides a rotation 107 in the polarisation state. The reciprocal rotators 83–85 result in polarizations state 108. This is followed by translation by the walkoff plate 81 which results in an alignment of the polarisation state 109 which is output to the fibre B.

Figure 7:
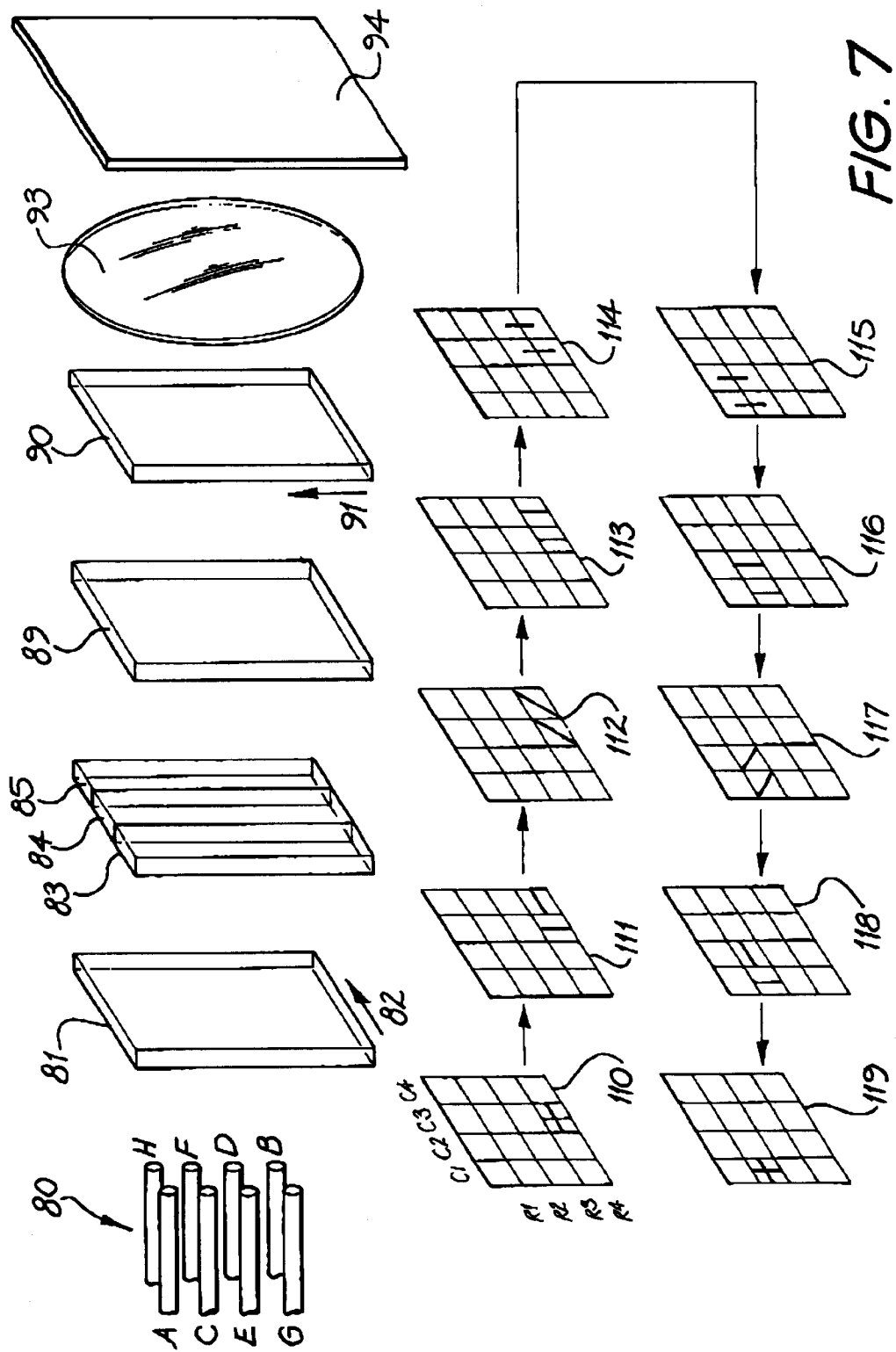

Turning now to FIG. 7, there is illustrated the corresponding series of polarisation states in going from fibre B to fibre C. Starting from the initial polarisation state 110, the walkoff plate 81 separates the polarisation states 111. The series of reciprocal rotators 83–85 result in an alignment 112 to the polarisation state. This is followed by the non-reciprocal rotator 89 rotating the polarisation states 113. The walkoff plate 90 results in a translation in the direction 91 so as to produce polarisation state 114 which is translated to polarisation state 115 by the lens 93 and mirror 94. The walkoff plate 90 in turn results in the polarisation state 116 which is rotated to 117 in a non-reciprocal manner by the Faraday rotator 89. The reciprocal rotators 83–85 result in the polarisation state 118 which in turn results in an alignment 119 of the polarisation state which is output to the fibre C.

Figure 8:
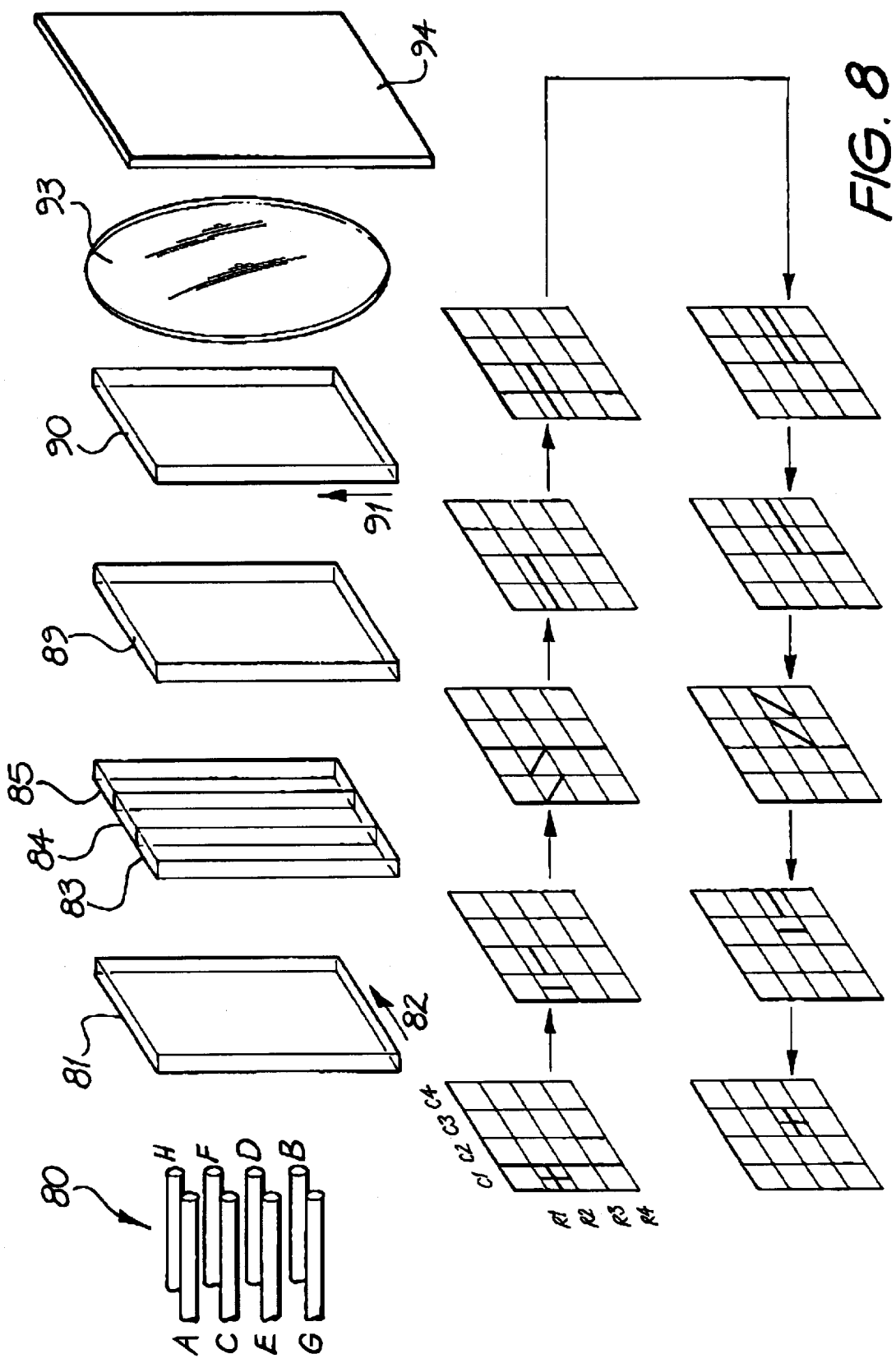
Figure 9:
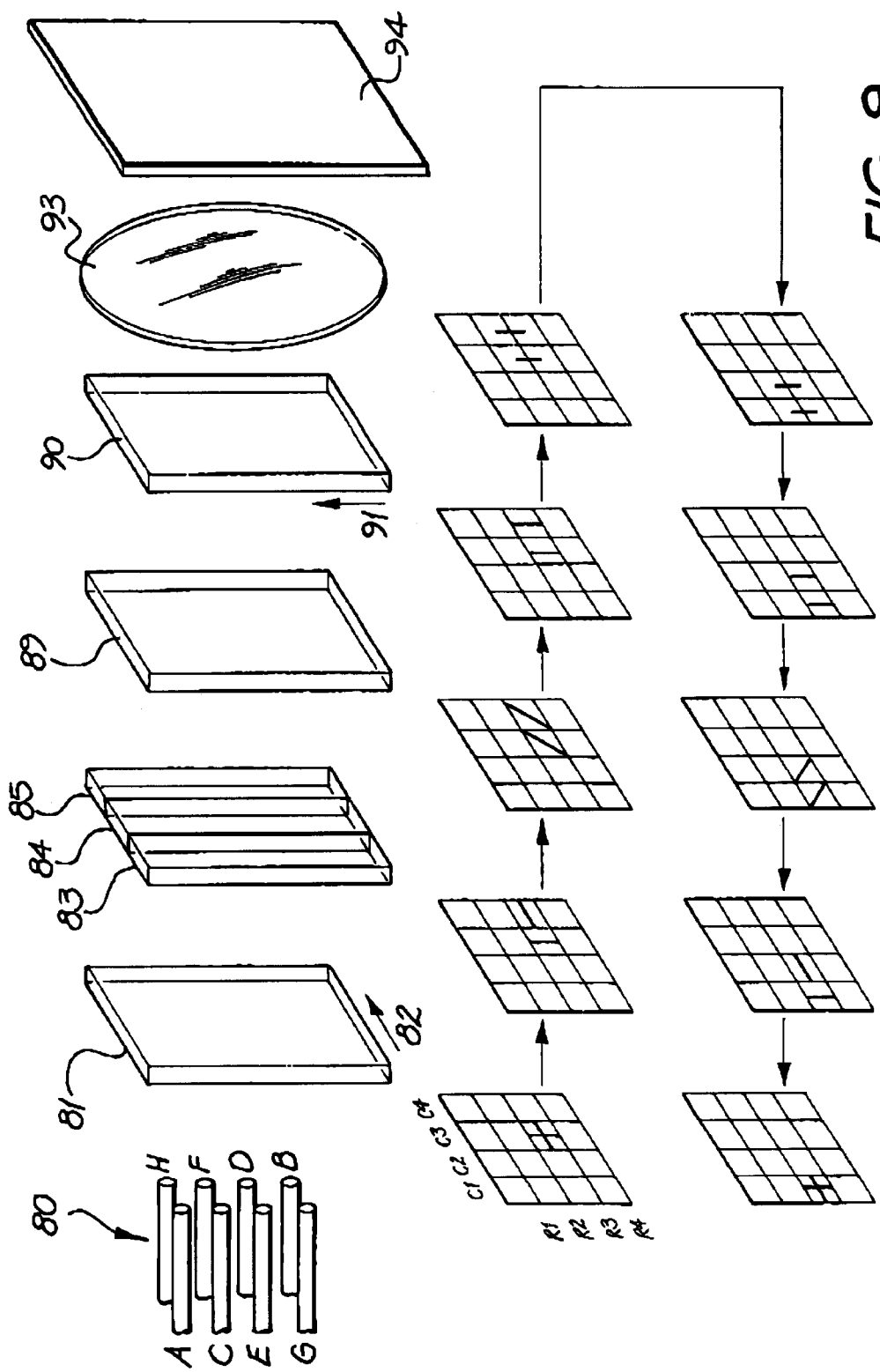

For completeness, FIG. 8 illustrates the corresponding polarisation transition diagrams for the transmission of light from fibre C to fibre D. FIG. 9 further illustrates the polarisation transition diagram for light going from the fibre D to the fibre E.

Figure 10:
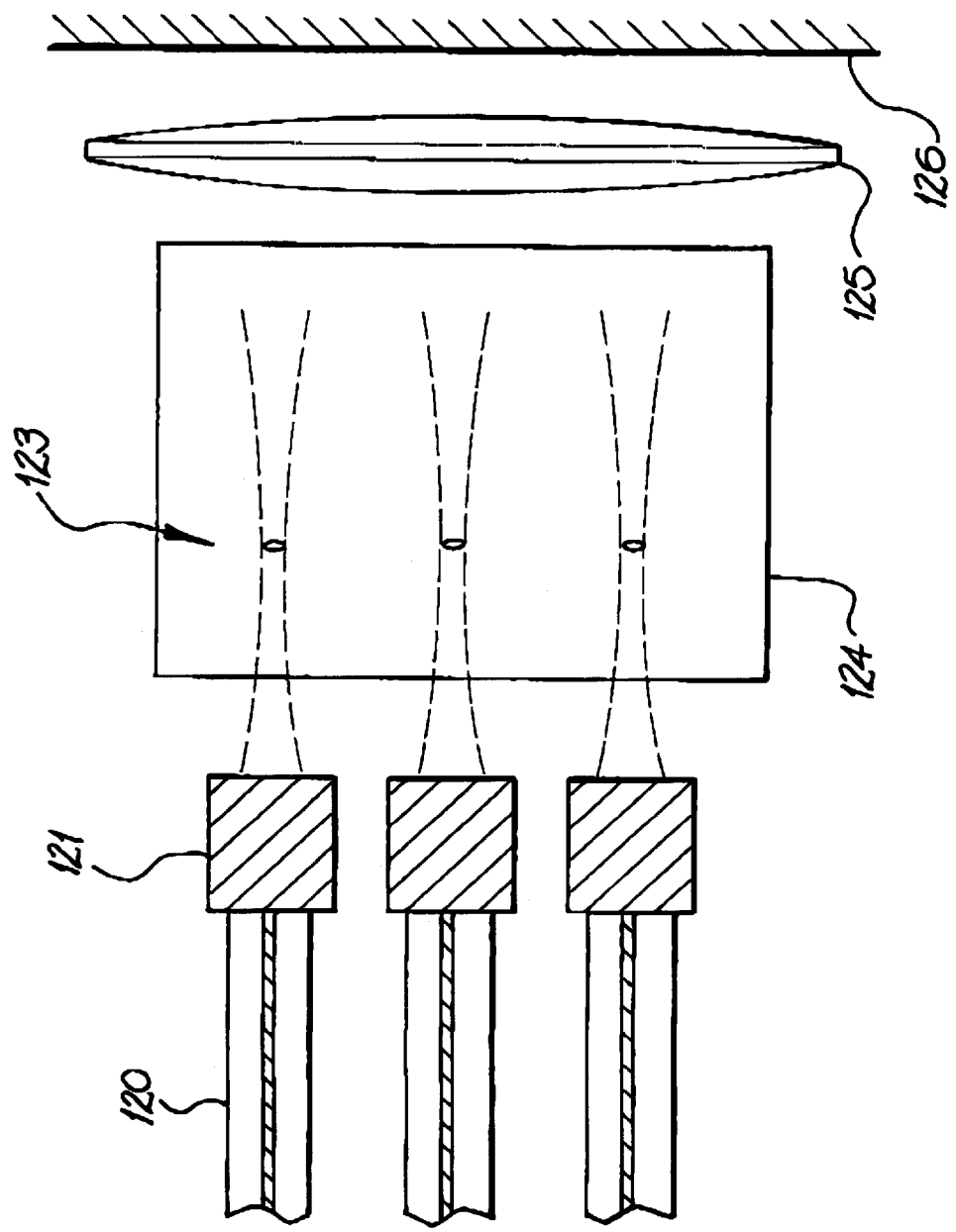
FIG. 10 and FIG. 11 illustrate modified forms of the present invention.

Whilst it will be evident to those skilled in the art that a number of modifications to the disclosed embodiments can be made whilst still utilising the core of the present invention, a number of such modifications will now be discussed. Firstly, the mode expansion can be implemented utilising different techniques. For example, as shown in FIG. 10, graded index fibre imaging can be utilised. In this modification to the arrangement of FIG. 1, the single mode fibre e.g. 120 includes a gradient index (GRIN) fibre 121 which projects a mode enlarged image e.g. 123 part way along the circulator elements which are indicated generally 124. The image 123 is further again imaged by lens 125 and mirror 126.

Figure 11:
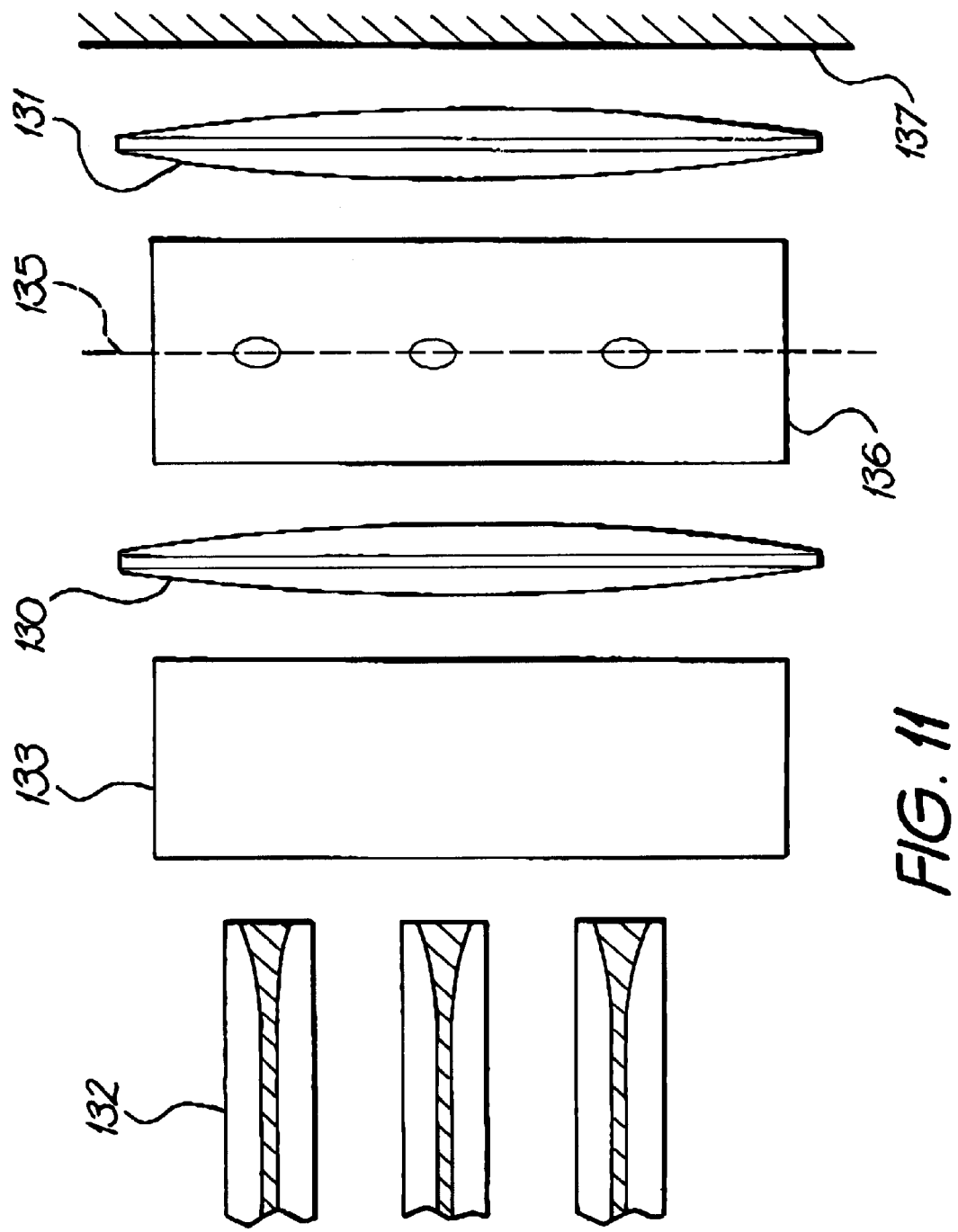

Also, the lensing arrangements can be altered in accordance with requirements. For example, FIG. 11 illustrates a re-arrangement which includes two lenses 130, 131. The image from the thermally expanded core fibre e.g. 132 is projected through circulator elements 133 before being imaged by lens 130 along an image plane 135, which can be part way along further circulator elements. The lens 131 and mirror 137 also act to image and reflect the polarisation components as previously discussed.

From the aforegoing discussion, it can be seen that the embodiments include a number of significant advantages. These include polarisation independence of operation and good isolation of return paths. Good separation of polarization states is provided by means of mode expansion or offsetting of the mode expanded image such that light is most strongly confined in the region where the polarisation states can to be acted upon separately.

It would be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

We claim:

1. A non-reciprocal optical device mapping a series of optical input/output signal waveguides to a corresponding series of optical input/output signal waveguides, said device comprising:

a series of spaced apart input/output waveguides;

a reflective imaging system for reflecting and focussing light emitted from said input/output waveguides;

a plurality of crystal elements between said input/output waveguides and said reflective imaging means;

at least one non-reciprocal polarization rotation element;

wherein light emitted from a first input/output waveguide is transmitted to a second input/output waveguide and light emitted from said second input/output waveguide is transmitted to a third input/output waveguide, said transmissions being in a polarization independent manner.

2. A device as claimed in claim 1 wherein light emitted from said third input/output waveguide is transmitted to said first input/output waveguide.

3. A device as claimed in claim 1 wherein said input/output signal waveguides comprise optical fibres.

4. A device as claimed in claim 1 further comprising:

a series of reciprocal polarization rotators located between said input/output waveguides and said reflective imaging means.

5. A device as claimed in claim 3 wherein said fibres include expanded core ends.

6. A device as claimed in claim 5 wherein said expanded core ends are thermally expanded.

7. A device as claimed in claim 3 wherein said fibres are gradient index fibres.

8. A device as claimed in claim 1 wherein the light emitted from said waveguides undergoes mode expansion at a point away from the waveguide end by means of a lensing system.

9. A non-reciprocal optical device mapping a series of optical input/output signal waveguides to a series of optical input/output waveguides, said device comprising:

a series of spaced apart input/output signal waveguides;

a first polarization separation means for spatially separating the optical input signals emitted from said optical input/output signal waveguides into orthogonal polarization components;

a first series of reciprocal rotators for applying a reciprocal rotation to said orthogonal polarization components so as to align said polarisations thereby producing aligned polarization components;

a non-reciprocal rotator for applying a non-reciprocal rotation to aligned polarization components;

a second polarization separation means for spatially displacing aligned polarization components;

at least one reciprocal rotator for rotating the aligned polarization components emitted from a subset of said input/output signal waveguides;

imaging means for imaging said aligned polarization components to produce imaged polarization components; and reflection means for reflecting said polarization components wherein light emitted from a first input/output waveguide is transmitted to a second input/output waveguide in a polarization independent manner and light emitted from said second input/output waveguide is transmitted to a third input/output waveguide in a polarization independent manner.

10. A device as claimed in claim 9 wherein light emitted from said third input/output waveguide is transmitted to said first input/output waveguide.

11. A device as claimed in claim 9 wherein said input/output signal waveguides comprise optical fibres.

12. A non-reciprocal optical device comprising:

at least two spaced apart rows each containing at least one input/output waveguide;

a first polarization dependant displacement means spatially displacing orthogonal polarizations of light emitted from said waveguides;

a first series of reciprocal rotators aligning the orthogonal polarizations emitted from said first polarization displacement means;

a non reciprocal rotator rotating said aligned polarization states in a non reciprocal manner;

a second polarization dependant displacement means displacing light emitted from said reciprocal rotator in a polarization dependant manner;

focusing means for focusing light emitted from said waveguides substantially on said waveguides;

reflection means reflecting light emitted from a first of said rows back in the direction of a second of said rows;

wherein light emitted from a first one of said waveguides in a first row is transmitted to a first one of said waveguides in a second row in a non reciprocal manner.

13. A device as claimed in claim 12 wherein light emitted from said first one of said waveguides in said second row is transmitted to a second one of said waveguides in said first row.

14. A device as claimed in claim 13 wherein the number of waveguides in each row is four and light emitted from any one of said waveguides in a first row is transmitted to a predetermined waveguide in said second row.

15. A device as claimed in claim 12 wherein said first polarization means translates one orthogonal polarization state substantially perpendicular to said rows.

16. A device as claimed in claim 12 wherein said first series of reciprocal rotators comprise a series of abutted reciprocal rotators which rotate the displaced orthogonal polarizations in an opposite direction.

17. A device as claimed in claim 12 wherein said focusing means is adjacent said reflection means.

18. A device as claimed in claim 12 wherein said second polarization displacement means displaces one of said polarizations parallel to said rows.

19. A non-reciprocal optical device comprising:

at least three input/output waveguides each having a corresponding lensing system wherein light emitted from a first input/output waveguide is transmitted to a second input/output waveguide and light emitted from said second input/output waveguide is transmitted to a third input/output waveguide, and wherein light emitted from said waveguides undergoes mode expansion at a point away from the corresponding end of the waveguide by means of a corresponding said lensing system, said device further comprising a further lensing system to focus the mode expanded light emitted from said waveguides.

* * * * *